US012129558B2

United States Patent
Komuro et al.

(10) Patent No.: US 12,129,558 B2
(45) Date of Patent: *Oct. 29, 2024

(54) SOFT MAGNETIC MATERIAL AND METHOD FOR PRODUCING THE SAME, AND ELECTRIC MOTOR CONTAINING SOFT MAGNETIC MATERIAL

(71) Applicant: Hitachi, Ltd., Tokyo (JP)

(72) Inventors: Matahiro Komuro, Tokyo (JP); Yuichi Satsu, Tokyo (JP); Hisamitsu Hatou, Tokyo (JP); Seunghwan Park, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/414,357

(22) PCT Filed: Sep. 11, 2019

(86) PCT No.: PCT/JP2019/035654
§ 371 (c)(1),
(2) Date: Jun. 16, 2021

(87) PCT Pub. No.: WO2020/166115
PCT Pub. Date: Aug. 20, 2020

(65) Prior Publication Data
US 2022/0042157 A1 Feb. 10, 2022

(30) Foreign Application Priority Data

Feb. 13, 2019 (JP) .................. 2019-023282

(51) Int. Cl.
*H01F 1/147* (2006.01)
*C21D 1/06* (2006.01)
*C22C 38/00* (2006.01)
*C22C 38/12* (2006.01)
*C23C 8/22* (2006.01)
*H02K 1/02* (2006.01)

(52) U.S. Cl.
CPC .................. *C23C 8/22* (2013.01); *C21D 1/06* (2013.01); *C22C 38/001* (2013.01); *C22C 38/12* (2013.01);
(Continued)

(58) Field of Classification Search
None
See application file for complete search history.

(56) References Cited

U.S. PATENT DOCUMENTS

2014/0290434 A1 10/2014 Matthiesen
2015/0038380 A1 2/2015 Nagamatsu et al.
(Continued)

FOREIGN PATENT DOCUMENTS

CN 104220621 A 12/2014
JP 07-118703 A 5/1995
(Continued)

OTHER PUBLICATIONS

Britannica, The Editors of Encyclopaedia. "austenite". Encyclopedia Britannica, Apr. 29, 2013, https://www.britannica.com/technology/austenite. Accessed Nov. 10, 2022. (Year: 2013).*
(Continued)

*Primary Examiner* — Kim S. Horger
(74) *Attorney, Agent, or Firm* — MATTINGLY & MALUR, PC

(57) ABSTRACT

A soft magnetic material that is sheet-shaped or foil-shaped and has a high saturation magnetic flux density, contains iron, carbon, and nitrogen, and includes a martensite containing carbon and nitrogen, and γ-Fe, wherein the γ-Fe includes a nitrogen-containing phase. The soft magnetic material is produced by steps of heating an iron-based material that is sheet-shaped or foil-shaped, carburizing the iron-based material with a carburizing gas, dispersing a granular carbide in α-Fe in the iron-based material at a
(Continued)

temperature equal to or lower than a eutectoid temperature, transforming the α-Fe into γ-Fe at a temperature higher than the eutectoid temperature, diffusing nitrogen into the γ-Fe using a nitrogen supply gas to form γ-Fe—N—C, and rapidly heating and then rapidly cooling the γ-Fe—N—C to transform the γ-Fe—N—C into a martensite. The result is a thermally stable soft magnetic material having a saturation magnetic flux density higher than that of pure iron.

17 Claims, 4 Drawing Sheets

(52) U.S. Cl.
CPC ............... *H01F 1/147* (2013.01); *H02K 1/02* (2013.01); *C21D 2211/008* (2013.01); *C22C 2202/02* (2013.01)

(56) References Cited

U.S. PATENT DOCUMENTS

| | | | |
|---|---|---|---|
| 2016/0042849 A1* | 2/2016 | Wang | C22C 1/1031 427/128 |
| 2017/0243680 A1 | 8/2017 | Wang et al. | |
| 2022/0328225 A1* | 10/2022 | Komuro | C21D 9/46 |

FOREIGN PATENT DOCUMENTS

| | | |
|---|---|---|
| JP | 09-143635 A | 6/1997 |
| JP | 2001-176715 A | 6/2001 |
| JP | 2005-002381 A | 1/2005 |
| JP | 2005-113184 A | 4/2005 |
| JP | 2005-226116 A | 8/2005 |
| JP | 2007-046074 A | 2/2007 |
| JP | 2015-507354 A | 3/2015 |
| JP | 2017-166010 A | 9/2017 |
| JP | 2017530547 A * | 10/2017 |

OTHER PUBLICATIONS

Migaku Takahashi, et al., "New soft magnetic material of α-Fe—C with high Bs", Journal of Magnetism and Magnetic Materials 239 (2002) p. 479-483.

International Search Report of PCT/JP2019/035654 dated Nov. 26, 2019.

Chinese Office Action received in corresponding Chinese Application No. 201980091441.8 dated Feb. 16, 2022.

Japanese Office Action received in corresponding Japanese Application No. 2019-023282 dated Nov. 15, 2022.

* cited by examiner

SOFT MAGNETIC MATERIAL AND METHOD FOR PRODUCING THE SAME, AND ELECTRIC MOTOR CONTAINING SOFT MAGNETIC MATERIAL

TECHNICAL FIELD

The present invention relates to a soft magnetic material and a method for producing the same, and an electric motor containing the soft magnetic material.

BACKGROUND ART

Among bulk alloys, a material having the highest saturation magnetic flux density is a Fe—Co alloy. Unfortunately, Co used as an alloy element is costly, and therefore an element alternative to Co is desired.

An example of a material that exhibits, in the form of a thin film, a saturation magnetic flux density (hereinafter abbreviated as Bs) equivalent to that of a Fe—Co alloy is a Fe-based martensite. It is known that among Fe-based martensites, a thin film or foil of a martensite containing $Fe_{16}N_2$ as a main component has a Bs exceeding 2.4 T.

PTL 1 discloses a process for producing an ordered martensitic iron nitride powder, the process including contacting an iron alloy powder having uniformity with a nitrogen source in a fluidized bed reactor to produce a nitride iron powder, transforming the nitride iron powder to a disordered martensitic phase, and annealing the disordered martensitic phase to an ordered martensitic phase.

PTL 2 discloses an article including a first set of layers, each layer of the first set of layers containing $\alpha''\text{-}Fe_{16}N_2$, and a second set of layers, each layer of the second set of layers containing a mixture of $\alpha''\text{-}Fe_{16}N_2$ and $\alpha''\text{-}Fe_{16}Z_2$, wherein Z contains at least one of C, B, or O.

PTL 3 discloses a method of mixing an iron oxide powder with a carbon-containing powder to give a mixed powder, heating the mixed powder in a non-oxidizing atmosphere to give metal fine particles coated with graphite and containing Fe as a main component, and heating the metal fine particles in an atmosphere containing ammonia to nitride the metal fine particles.

PTL 4 discloses a high saturation magnetization Fe—N magnetic material having, as a main phase, a mixed phase of an $\alpha$-Fe phase and a $Fe_{16}N_2$ phase.

CITATION LIST

Patent Literature

PTL 1: JP 2015-507354 A
PTL 2: JP 2017-530547 A
PTL 3: JP 2007-046074 A
PTL 4: JP 2001-176715 A

SUMMARY OF INVENTION

Technical Problem

The conventional martensitic magnetic materials containing nitrogen and carbon have problems in thermal stability and mass productivity as bulk soft magnetic materials, and also in ensuring stability of a high saturation magnetic flux density.

The ordered martensitic iron nitride described in PTL 1 is powdery, and therefore, there is room for improvement in that even a sheet obtained by compressing the ordered martensitic iron nitride has a low saturation magnetic flux density per volume.

PTLs 2 to 4 do not disclose an invention in which a Fe-based martensite serves as an essential component.

An object of the present invention is to produce a thermally stable soft magnetic material having a saturation magnetic flux density higher than that of pure iron at low cost, and to improve the characteristics of a magnetic circuit of an electric motor or the like using the soft magnetic material to realize miniaturization and increase of torque of the electric motor or the like.

Solution to Problem

A soft magnetic material of the present invention is sheet-shaped or foil-shaped and has a high saturation magnetic flux density, contains iron, carbon, and nitrogen, and includes a martensite containing carbon and nitrogen, and $\gamma$-Fe. The $\gamma$-Fe includes a nitrogen-containing phase formed therein.

A method for producing a soft magnetic material of the present invention includes steps of heating an iron-based material that is sheet-shaped or foil-shaped, carburizing the iron-based material with a carburizing gas, dispersing a granular carbide in $\alpha$-Fe in the iron-based material at a temperature equal to or lower than a eutectoid temperature, transforming the —Fe into $\gamma$-Fe at a temperature higher than the eutectoid temperature, diffusing nitrogen into the $\gamma$-Fe using a nitrogen supply gas to form $\gamma$-Fe—N—C, and rapidly heating and then rapidly cooling the $\gamma$-Fe—N—C to transform the $\gamma$-Fe—N—C into a martensite.

Advantageous Effects of Invention

According to the present invention, it is possible to produce a thermally stable soft magnetic material having a saturation magnetic flux density higher than that of pure iron at low cost, and to improve the characteristics of a magnetic circuit of an electric motor or the like using the soft magnetic material to realize miniaturization and increase of torque of the electric motor or the like.

DESCRIPTION OF EMBODIMENTS

Figure 1:
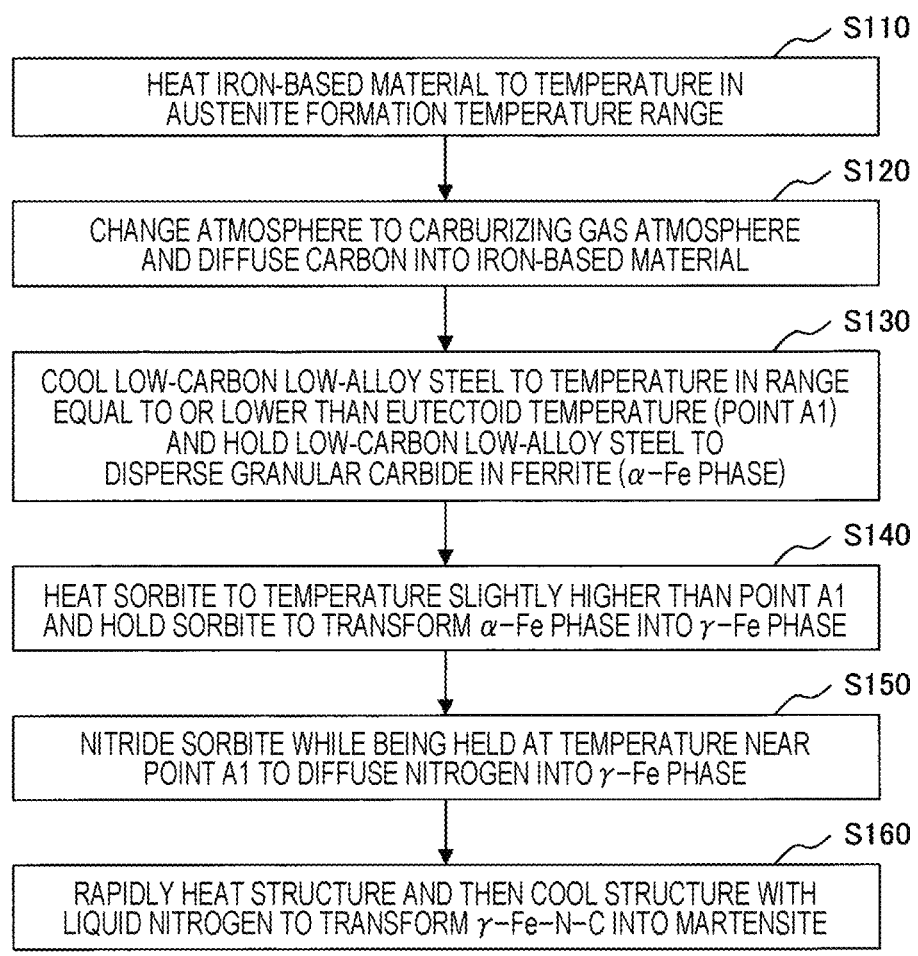
FIG. 1 is a flowchart showing a method for producing a soft magnetic material of the present invention.

To an electric motor such as a motor, a soft magnetic material obtained by laminating thin sheets or foil materials is applied. Each of the thin sheets or foil materials has a thickness in the range of 1 µm or more and 1 mm or less, and the thin sheets or foil materials are laminated so that they may be commercialized.

When a laminate made of an iron-based martensite is applied to an electric motor, it is required that the laminate have a saturation magnetic flux density higher than that of iron, that is, higher than 2.1 T, that the laminate exhibit soft magnetism, that the laminate have thermal stability, and that the laminate be processable. From the above-mentioned viewpoints, low-cost carbon and nitrogen are selected as constituent elements of the iron-based martensite.

A martensite, which is formed by the positioning of a plurality of interstitial elements such as carbon and nitrogen between iron atoms, has a Bs of 2.1 to 2.8 T depending on the control of the composition and phase structure of the martensite. There have not been disclosed the control of parameters that enable mass production as well as basic specifications of a foil material produced by the control. In addition, there have not been disclosed a phase structure with which the Bs stably exceeds 2.1 T as well as a mass production process that can realize the phase structure.

It is considered desirable to independently control and diffuse carbon and nitrogen. It is also considered important that the diffused carbon and nitrogen be present inside an iron lattice.

The specifications required of such a martensitic material are as follows.

1) Part of the face-centered cubic crystal is a phase that is ferromagnetic at 20° C. and contains nitrogen or carbon.

2) The carbon concentration or nitrogen concentration is recognized to be modulated.

Microstructures corresponding to these specifications are as follows.

1) In order to achieve a high saturation magnetic flux density, it is desirable that the martensitic material include a cubic or tetragonal crystal in which carbon and nitrogen are present at the tetrahedral or octahedral site.

2) When a carbon atom or a nitrogen atom is positioned at an octahedral interstitial site of a body-centered cubic crystal or an octahedral site of a face-centered cubic crystal, part of the adjacent iron atoms have an increased magnetic moment.

3) When nitrogen is positioned at an octahedral site of a face-centered cubic lattice, the iron spin is parallelized and the magnetization is increased.

4) A phase having a higher carbon concentration tends to have a lower nitrogen concentration. Periodic formation of crystals having a locally high carbon concentration decreases the crystal magnetic anisotropy energy. Due to such an effect, coercive force on a magnetization curve decreases.

Next, a process method for realizing the above-mentioned specifications will be described.

An iron-based material is heated to a temperature in an austenite (γ) formation temperature range, and carbon is diffused into the iron-based material using a carburizing gas such as acetylene. After the carbon concentration reaches 0.5 mass % or more, the iron-based material is cooled, heated to a temperature in a range equal to or lower than a eutectoid temperature (point A1), and held in that state to disperse a granular carbide in ferrite (an α-Fe phase). The structure containing the granular carbide dispersed in α-Fe is referred to as a sorbite.

The amount of carbon soluble in the α-Fe phase is small. Therefore, when the sorbite is heated to a temperature higher than the point A1, α-Fe is transformed into γ-Fe before the carbide is dissolved. Since nitrogen hardly enters a carbide, especially $Fe_3C$, when the sorbite is heated to a temperature near the point A1 and nitrided, nitrogen diffuses into γ-Fe, which is formed by transformation of α-Fe. The nitrogen concentration in the gas phase is adjusted so that the γ-Fe may have a nitrogen concentration of 0.5 mass % or more.

After the completion of the nitrogen diffusion treatment, the product has a structure in which $Fe_3C$ (or $M_3C$) is dispersed in a γ-Fe—N matrix. The structure of this state is rapidly heated to decompose the carbide into the γ-Fe phase, and then the structure is rapidly cooled.

Further, a specific example of the method for producing the soft magnetic material of the present invention will be described.

FIG. 1 is a flowchart showing an example of the method for producing the soft magnetic material of the present invention.

In an argon (Ar) atmosphere, a 0.2 mm-thick low-carbon low-alloy steel (iron-based material) is heated to 900° C., which is in the austenite (γ) formation temperature range, at a heating rate of 10° C./min (S110). Herein, the low-carbon low-alloy steel means a steel having a carbon content of 0.25 mass % or less and containing 5 mass % or less in total of added alloy elements.

Then, acetylene ($C_2H_2$) as a carburizing gas is supplied into the Ar atmosphere so that the carbon concentration may be 0.5 mass % or more (S120: carburizing step). In addition to acetylene, methane, propane, butane or the like may also be used as the carburizing gas.

Then, after cooling to 200° C. using an Ar gas, the low-carbon low-alloy steel is heated to 700° C. that is equal to or lower than the eutectoid temperature (point A1) and held in that state (S130). The heating rate is 10° C./min. At 700° C., a granular carbide is dispersed and grown in ferrite (an α-Fe phase). The spacing between the carbide particles is 0.1 µm to 1 µm. The average diameter (diameter) of the carbide particles is 0.1 µm to 2 µm. The amount of carbon soluble in the α-Fe phase is as small as 0.1 mass % or less.

The sorbite is heated to 750° C., that is, a temperature higher than the point A1 to transform α-Fe having a low carbon concentration into γ-Fe before the carbide is dissolved or decomposed (S140). The granular carbide is mainly $Fe_3C$, and also includes $M_3C$ such as $(Fe,Cr)_3C$, and MC. Nitrogen hardly enters a carbide such as $Fe_3C$.

When the sorbite is heated to 750° C. near the point A1 and nitrided with a nitrogen supply gas such as ammonia ($NH_3$), nitrogen diffuses and dissolves in γ-Fe, which results from transformation of α-Fe (S150). The nitrogen concentration in the gas phase is adjusted so that the γ-Fe may have a nitrogen concentration of 0.5 mass % or more.

After the completion of the nitrogen diffusion treatment, the product has a structure in which $Fe_3C$ (or $M_3C$) is dispersed in a γ-Fe—N matrix. The structure of this state is heated to 950° C. by rapid heating at 100° C./sec. After the structure is held at 950° C. for 1 second, the structure is cooled with liquid nitrogen (S160). The carbide is decomposed into the γ-Fe phase by the rapid heating. In addition, γ-Fe—N—C is transformed into a martensite by cooling with liquid nitrogen (rapid cooling).

Parameters in the above-mentioned production process will be described below.

It is desirable that the iron-based material have a thickness of 0.01 mm or more and 1.00 mm or less. If the thickness is less than 0.01 mm, after the soft magnetic material is laminated on an insulating layer, the insulating layer has an increased volume fraction, and it is difficult to set the saturation magnetic flux density (Bs) of the laminate to 2.1 T or more.

It is desirable that the composition of the alloy steel have a carbon concentration of 1.5 mass % or less. If the carbon concentration exceeds 1.5 mass %, the carbide tends to have a flaky shape instead of a granular shape, and a part of the carbide tends to remain even after rapid heating and cooling by radio frequency or the like, so that the saturation magnetic flux density may decrease.

It is desirable that the carburizing temperature be 800° C. to 1100° C. If the carburizing temperature is less than 800° C., diffusion takes time. Alternatively, if the carburizing temperature exceeds 1100° C., the sheet material (material to be treated) may have an increased crystal grain size, and uneven distribution of carbon at the grain boundaries may proceed. In order to prevent the growth of pearlite with coarse carbides, the cooling after the carburization may be performed by gas cooling to form bainite or fine pearlite.

When the structure mainly including bainite or fine pearlite is heated to 700° C. that is equal to or lower than the eutectoid temperature (point A1), the morphology of the carbide changes significantly and the interfacial energy decreases, so that the carbide becomes granular or spherical.

The heating and holding temperature is required to be in a temperature range lower than the A1 transformation point. If the iron-based material is heated to a temperature equal to or higher than the point A1, the carbide is dispersed in the spherical shape, and some α-Fe is transformed into the γ phase to dissolve carbon. Since nitrogen is difficult to diffuse into γ-Fe in which carbon is dissolved as well as into the carbide, it is difficult to increase the nitrogen concentration to 0.5 mass % or more. Therefore, it is necessary to hold the temperature in the range equal to or lower than the point A1 to form the sorbite structure.

When the sorbite structure is heated to 750° C., α-Fe is transformed into α-Fe. The γ-Fe has a low carbon content, and nitrogen is easily introduced and diffused into the γ-Fe. Since the diffusion of nitrogen into the carbide is difficult to proceed, nitrogen diffuses into the low-carbon γ-Fe. The diffusion of nitrogen into the low-carbon γ-Fe lowers the point A1 around the nitrogen and promotes the conversion into γ. The larger the distance from the carbide particles is, the more the nitrogen concentration tends to increase and the carbon concentration tends to decrease. In this case, the composition of nitrogen and carbon is modulated. The composition modulation is more remarkable as the nitrogen introduction treatment time is shorter.

When trace metal elements (such as Cr, V, Mo, Ti, Nb, Zr, W, and Mn) that delay the dissolution and decomposition of the carbide are found in the carbide, it is possible to shorten the treatment time for introducing nitrogen into the γ-Fe. A typical granular carbide is $Fe_3C$, and $Fe_3C$ may contain $M_3C$ such as $(Fe,Cr)_3C$, and MC such as VC, TiC, NbC, and WC mixed therein (M is a metal element). When the sorbite is heated to 750° C. near the point A1 and nitrided with a nitrogen supply gas such as $NH_3$, nitrogen diffuses and dissolves in the γ-Fe, which results from transformation of the α-Fe. The nitrogen concentration in the gas phase is adjusted so that the γ-Fe may have a nitrogen concentration of 0.5 mass % or more. After the completion of the nitrogen diffusion treatment, the product has a structure in which $Fe_3C$ (or $M_3C$) is dispersed in the γ-Fe—N matrix.

The structure of this state is rapidly heated at a rate exceeding 10° C./sec to 950° C., which is in the γ single-phase region in the phase diagram. The structure is held in the γ single-phase region for a short time, and then cooled in liquid nitrogen. The carbide is decomposed into the γ-Fe phase by the rapid heating and cooling. In addition, γ-Fe—N—C is transformed into a martensite by cooling in liquid nitrogen.

The main phases in the obtained structure are bcc (body-centered cubic) and bct (body-centered tetragonal) martensites, nitrogen-containing fcc (face-centered cubic) austenite, and fcc (face-centered cubic) $Fe_4N$. Carbon and nitrogen are present inside the martensites.

In order to increase the saturation magnetic flux density, it is desirable that the volume fraction of the bcc or bct martensite be higher than the volume fraction of the ferromagnetic fcc phase. Further, as for the plurality of phases having the fcc crystal structure, it is desirable that the number of ferromagnetic phases be larger than the number of non-magnetic (or antiferromagnetic) phases.

Desirable embodiments of the present invention are summarized as follows.

It is desirable that the soft magnetic material according to an embodiment of the present invention be sheet-shaped or foil-shaped and have a high saturation magnetic flux density.

It is desirable that the soft magnetic material include a martensite containing carbon and nitrogen, and γ-Fe.

It is desirable that the γ-Fe include a nitrogen-containing phase formed therein.

It is desirable that the γ-Fe include a face-centered cubic crystal containing nitrogen.

It is desirable that the volume fraction of the face-centered cubic crystal containing nitrogen be 1 vol % or more and lower than the volume fraction of the martensite containing carbon and nitrogen.

It is desirable that the volume fraction of the face-centered cubic crystal containing nitrogen be 1 vol % or more and 20 vol % or less.

It is desirable that the martensite containing carbon and nitrogen include a body-centered cubic crystal and a body-centered tetragonal crystal.

It is desirable that the soft magnetic material have an average carbon concentration of 0.45 mass % or more and 1.12 mass % or less, and an average nitrogen concentration of 0.4 mass % or more and 1.2 mass % or less.

It is desirable that the soft magnetic material further contain vanadium or niobium. Vanadium or niobium is an additive element. The amount of the additive element is preferably less than 1 mass %, and more preferably less than 0.1 mass %.

The method for producing a soft magnetic material according to an embodiment of the present invention includes carburizing an iron-based material that is sheet-shaped or foil-shaped with a carburizing gas, dispersing a granular carbide in α-Fe in the iron-based material at a temperature equal to or lower than a eutectoid temperature, transforming the α-Fe into γ-Fe at a temperature higher than the eutectoid temperature, diffusing nitrogen into the γ-Fe using a nitrogen supply gas to form γ-Fe—N—C, and rapidly heating and then rapidly cooling the γ-Fe—N—C to transform the γ-Fe—N—C into a martensite.

It is desirable that the iron-based material used in the production method have a thickness of 0.01 mm or more and 1.00 mm or less.

It is desirable that the iron-based material as a raw material be pure iron or a low-carbon low-alloy steel.

It is desirable that the carburizing gas be acetylene.

It is desirable that the nitrogen supply gas be ammonia.

It is desirable that the rapid cooling be performed using liquid nitrogen.

It is desirable that the iron-based material as a raw material contain vanadium or niobium.

The electric motor according to an embodiment of the present invention includes a core, a coil, and a rotor, and the core contains the soft magnetic material.

It is desirable that the core be a laminate of the soft magnetic material.

Example 1

A 0.1 mm-thick iron foil piece as a raw material is resistively heated to 950° C., which is in the austenite (γ) formation temperature range, at a heating rate of 10° C./min, and acetylene ($C_2H_2$) is supplied in a pulsed manner into an Ar atmosphere. The supply of acetylene is stopped after 5 minutes, diffusion is performed for 5 minutes, then acetylene is supplied for 3 minutes, diffusion is performed for 2 minutes, and acetylene is supplied for 1 minute to set the carbon concentration to 0.55 mass % or more, and then the iron foil is cooled to 400° C. using an Ar gas.

Then, the iron foil is heated to 700° C. that is equal to or lower than the eutectoid temperature (point A1) and held in that state. The heating rate is 10° C./min. At 700° C., a granular carbide is dispersed and grown in ferrite (an α-Fe phase). The spacing between the carbide particles is 0.2 μm. The average diameter of the carbide particles is 0.2 μm.

As described above, the sorbite, that is, the structure containing the granular carbide dispersed in α-Fe, is heated to 750° C. that is a temperature higher than the point A1. The granular carbide is mainly $Fe_3C$. When the sorbite is heated to 750° C. near the point A1 and nitrided with a nitrogen supply gas such as $NH_3$, nitrogen diffuses and dissolves in they-Fe, which results from transformation of the α-Fe. The nitrogen concentration in the gas phase is adjusted so that the γ-Fe may have a nitrogen concentration of 0.45 mass % (nitrogen diffusion treatment).

After the completion of the nitrogen diffusion treatment, the product has a structure in which $Fe_3C$ (or $M_3C$) is dispersed in the γ-Fe—N matrix. The structure of this state is heated to 950° C. by rapid heating at 100° C./sec. After the structure is held at 950° C. for 1 second, the structure is cooled in liquid nitrogen. The carbide is decomposed into the γ-Fe phase by the rapid heating. Then, γ-Fe—N—C is transformed into a martensite by cooling using liquid nitrogen.

The Fe—C—N foil material produced under these conditions is shown as No. 1 in Table 1.

As a result of measurement with a vibrating sample magnetometer at 20° C., the saturation magnetic flux density is 2.25 T, and the coercive force is 800 A/m. The volume fractions of phases in the phase structure calculated from the X-ray diffraction pattern and EBSD (Electron Back Scattering Diffraction) are 80%, 10%, 10%, and 0% for the bcc martensite, the bct martensite, the nitrogen-containing fcc phase, and the fcc $Fe_4N$, respectively.

Figure 2:
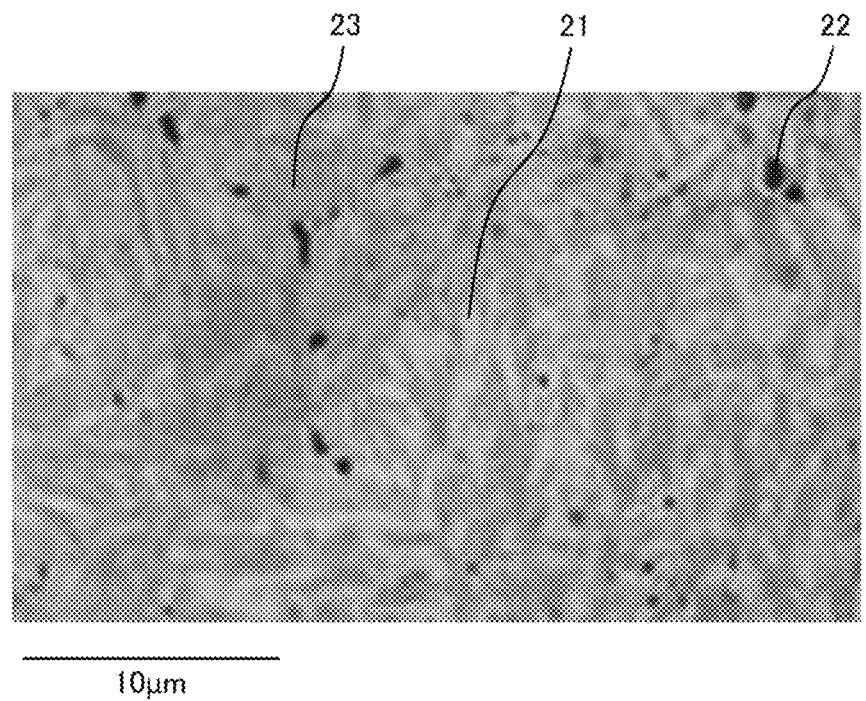
FIG. 2 is a SEM image showing a cross-sectional structure of a soft magnetic material of an example.

FIG. 2 shows a cross-sectional structure of the foil No. 1.

In the image, an almost white contrast (a white region 21) is observed, and the phase is a nitrogen-containing fcc phase. The black particles (a black region 22) are presumed to be a carbonitride. A gray region 23 is considered to be a bct phase or a bcc phase.

Figure 3:
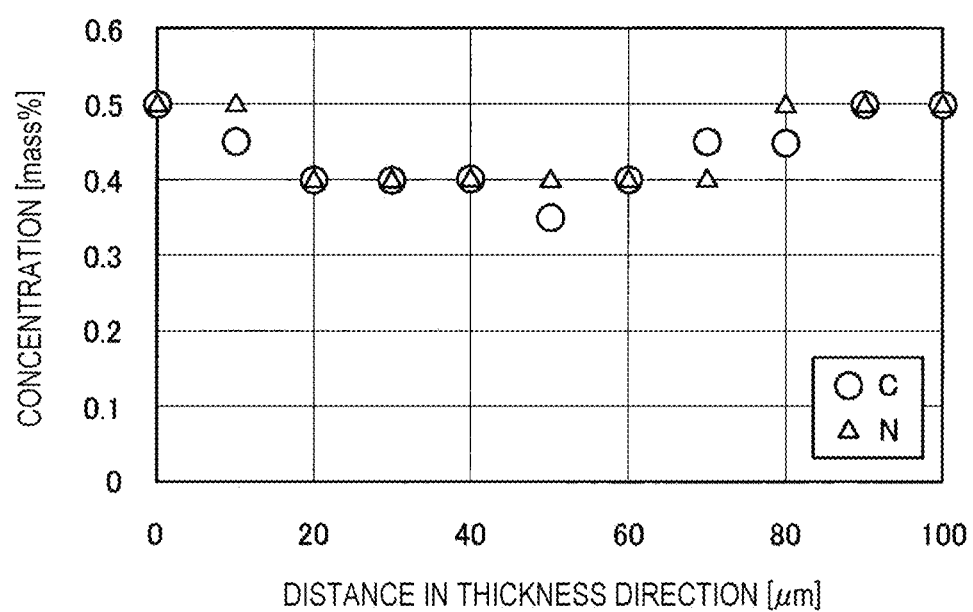
FIG. 3 is a graph showing a concentration distribution of carbon and nitrogen in a thickness direction of the soft magnetic material of the example.

FIG. 3 shows an example of the concentration distribution of the iron foil in the thickness direction thereof when the iron foil has an average carbon concentration of 0.45 mass % and an average nitrogen concentration of 0.45 mass %. The thickness of the iron foil is 100 μm. The horizontal axis represents the distance from one surface of the iron foil, that is, the distance in the thickness direction of the iron foil, and the vertical axis represents the concentration.

As shown in the graph, it is understood that the carbon and nitrogen concentrations are high in the range from the surface of the iron foil to a depth of 20 μm and the range from the opposite surface (back surface) of the iron foil to a depth of 20 μm (range of 100 to 80 μm). The carbon concentration at the center of the iron foil in the thickness direction is −0.1 mass % with respect to the average carbon concentration, and the carbon concentration near the surface of the iron foil is +0.05 mass % with respect to the average carbon concentration. In addition, the nitrogen concentration at the center of the iron foil in the thickness direction is −0.05 mass % with respect to the average nitrogen concentration, and the nitrogen concentration near the surface of the iron foil is +0.05 mass % with respect to the average nitrogen concentration.

As for the carbon concentration and nitrogen concentration, the results shown in Table 1 are obtained by controlling the carburizing time and diffusion time of carbon as well as the nitriding time and diffusion time of nitrogen.

The nitrogen-containing fcc phase in Table 1 is a ferromagnetic phase containing 0.05 mass % or more and 1.50 mass % or less of nitrogen. If the nitrogen concentration is less than 0.05 mass %, the phase is not ferromagnetic at 20° C. Conversely, if the nitrogen concentration exceeds 1.5 mass %, the phase has a crystal structure and a lattice constant similar to those of the $Fe_4N$ phase.

The saturation magnetic flux density of the bcc martensite changes due to the magnetovolume effect, electric field effect, effects of introducing defects such as dislocation, an arrangement including a defect, such as nitrogen-defect-carbon, and changes of space charge, which lead to an effect of increasing the magnetic flux density. The dislocation density is $5 \times 10^{16}/m^2$.

Example 2

A 0.2 mm-thick iron foil piece as a raw material contains 0.05 mass % of vanadium. The iron foil is resistively heated to 950° C., which is in the austenite (γ) formation temperature range, at a heating rate of 10° C./min, and acetylene ($C_2H_2$) is supplied in a pulsed manner into an Ar atmosphere. The supply of acetylene is stopped after 5 minutes, diffusion is performed for 5 minutes, then acetylene is supplied for 3 minutes, diffusion is performed for 2 minutes, and acetylene is supplied for 1 minute to set the carbon concentration to 0.75 mass %, and then the iron foil is cooled to 400° C. using an Ar gas. Then, the iron foil is heated to 700° C. that is equal to or lower than the eutectoid temperature (point A1) and held in that state. The heating rate is 10° C./min. At 700° C., a granular carbide is dispersed and grown in ferrite (an α-Fe phase). The spacing between the carbide particles is 0.2 μm. The average diameter of the carbide particles is 0.2 μm. The carbide includes $M_3C$ (M=Fe, V) and MC (M=Fe, V).

As described above, the sorbite, that is, the structure containing the granular carbide dispersed in α-Fe, is heated to 750° C. that is a temperature higher than the point A1. The granular carbide is mainly $M_3C$ (M=Fe, V) and MC (M=Fe, V). When the sorbite is heated to 750° C. near the point A1 and nitrided with a nitrogen supply gas such as $NH_3$, nitrogen diffuses and dissolves in the γ-Fe, which results from transformation of the α-Fe. The nitrogen concentration in the gas phase is adjusted so that the γ-Fe may have a nitrogen concentration of 0.45 mass %. After the completion of the nitrogen diffusion treatment, the product has a structure in which $M_3C$ (M=Fe, V) and MC (M=Fe, V) are dispersed in the γ-Fe—N matrix. The structure of this state is heated to 950° C. by rapid heating at 100° C./sec. After the structure is held at 950° C. for 1 second, the structure is cooled in liquid nitrogen. The carbide is partially decomposed into the γ-Fe phase by the rapid heating. Then, γ-Fe—N—C is transformed into a martensite by cooling using liquid nitrogen.

The Fe—C—N foil material produced under these conditions is shown as No. 10 in Table 1.

As a result of measurement with a vibrating sample magnetometer at 20° C., the saturation magnetic flux density is 2.45 T, and the coercive force is 1100 A/m. The volume fractions of phases in the phase structure calculated from the X-ray diffraction pattern and EBSD are 65%, 15%, 15%, and 5% for the bcc martensite, the bct martensite, the nitrogen-containing fcc phase, and the fcc Fe$_4$N, respectively.

The saturation magnetic flux density of the bcc martensite changes due to the magnetovolume effect, electric field effect, effects of introducing defects such as dislocation, an arrangement including a defect, such as nitrogen-defect-carbon, and changes of space charge, which lead to an effect of increasing the magnetic flux density. The dislocation density is $3 \times 10^{16}$/m$^2$.

Example 3

A 0.2 mm-thick iron foil piece as a raw material contains 0.02 mass % of vanadium. The iron foil is resistively heated to 1050° C., which is in the austenite (γ) formation temperature range, at a heating rate of 10° C./min, and acetylene (C$_2$H$_2$) is supplied in a pulsed manner into an Ar atmosphere. The supply of acetylene is stopped after 7 minutes, diffusion is performed for 10 minutes, acetylene is supplied for 4 minutes, diffusion is performed for 2 minutes, and acetylene is supplied for 5 minutes to set the carbon concentration to 0.85 mass %, and then the iron foil is held at 1000° C. for 1 hour. In this case, vanadium and carbon dissolve in the austenite.

After the iron foil is held at 1000° C., the iron foil is cooled to 400° C. using an Ar gas. Then, the iron foil is heated to 700° C. that is equal to or lower than the eutectoid temperature (point A1) and held. The heating rate is 10° C./min. At 700° C., a granular carbide is dispersed and grown in ferrite (an α-Fe phase). The spacing between the carbide particles is 0.05 μm. The average diameter of the carbide particles is 0.01 μm. The carbide includes M$_3$C (M=Fe, V) and MC (M=Fe, V).

As described above, the sorbite, that is, the structure containing the granular carbide dispersed in α-Fe, is heated to 750° C. that is a temperature higher than the point A1. The granular carbide is mainly M$_3$C (M=Fe, V) and MC (M=Fe, V). When the sorbite is heated to 750° C. near the point A1 and nitrided with a nitrogen supply gas such as NH$_3$, nitrogen diffuses and dissolves in the γ-Fe, which results from transformation of the α-Fe. The nitrogen concentration in the gas phase is adjusted so that the γ-Fe may have a nitrogen concentration of 1.15 mass %. After the completion of the nitrogen diffusion treatment, the product has a structure in which M$_3$C (M=Fe, V) and MC (M=Fe, V) are dispersed in the γ-Fe—N matrix. The structure of this state is heated to 1100° C. by rapid heating at 100° C./sec. After the structure is held at 1100° C. for 0.5 seconds, the structure is cooled using liquid nitrogen. The carbide is partially decomposed into the γ-Fe phase by the rapid heating, and γ-Fe—N—C is transformed into a martensite by cooling with liquid nitrogen.

The Fe—C—N foil material produced under these conditions is shown as No. 15 in Table 1.

As a result of measurement with a vibrating sample magnetometer at 20° C., the saturation magnetic flux density is 2.55 T, and the coercive force is 980 A/m. The volume fractions of phases in the phase structure calculated from the X-ray diffraction pattern and EBSD are 60%, 25%, 10%, and 5% for the bcc martensite, the bct martensite, the nitrogen-containing fcc phase, and the fcc Fe$_4$N, respectively.

The saturation magnetic flux density of the bcc martensite changes due to the magnetovolume effect, electric field effect, effects of introducing defects such as dislocation, an arrangement including a defect, such as nitrogen-defect-carbon, and changes of space charge, which lead to an effect of increasing the magnetic flux density. The dislocation density is $1 \times 10^{16}$/m$^2$. In the case where carbon or nitrogen atoms are trapped near the dislocation, and the cooling rate during the final quenching is low or oil quenching is performed at 60° C., the bct martensite is unlikely to be generated. Quenching in liquid nitrogen is desirable in order to increase the proportion of carbon atoms and nitrogen atoms positioned at the interstitial site of iron, and a thickness of 0.3 mm or less is desirable in order to ensure the cooling rate in quenching.

Example 4

Figure 4:
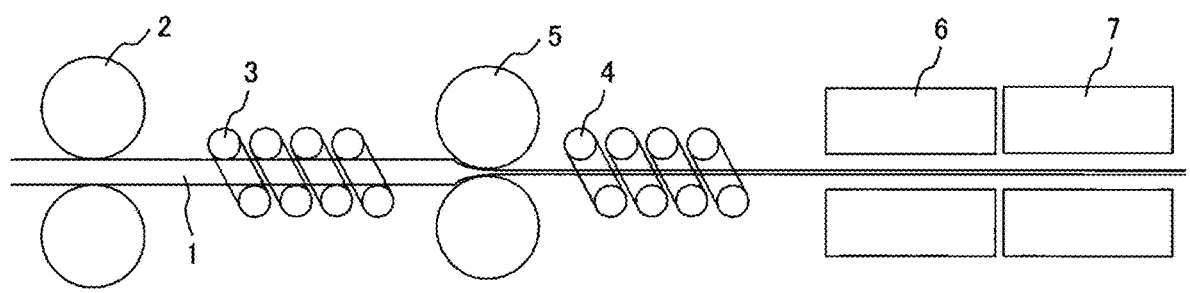
FIG. 4 is a schematic configuration diagram showing a facility for producing a soft magnetic material of an example.

FIG. 4 shows a facility for producing the soft magnetic material of the example.

As shown in the drawing, the present production facility includes rolling rolls 2 and 5, radio frequency coils 3 and 4, and heater furnaces 6 and 7. An example of an iron sheet 1 as a raw material is a pure iron sheet having a purity of 99.9% and a thickness of 0.5 mm.

The iron sheet 1 is rolled by the rolling rolls 2 to a thickness of 0.2 mm. The rolled iron sheet 1 is heated by the radio frequency coil 3 and continuously passes through an atmosphere in which an acetylene gas is supplied in a pulsed manner. The heating temperature is 950° C. The carburizing and diffusion time is 1 minute. The carbon concentration reaches 0.7 mass % by the treatment.

After the carburization, the iron sheet 1 is cooled to 700° C. or less by a nitrogen gas (N$_2$). Then, the iron sheet 1 is further rolled to a thickness of 0.1 mm by the rolling rolls 5 intended for introducing defects and forming a fiber structure. Due to the cooling, granular cementite grows inside the iron sheet 1. The dislocation density then is on the order of $10^{16}$/m$^2$.

After the rolling, nitrogen is introduced by an ammonia gas into the iron sheet 1 in a state of being heated to 750° C. by the radio frequency coil 4. The nitrogen concentration is about 0.6 mass %. The nitriding rate is increased due to the introduction of the dislocation, and it is possible to reduce the time to about 1/10 of that without rolling.

The iron sheet 1 is heated to a refining and quenching temperature by the heater furnaces 6 and 7 such as an infrared digital temperature controller, and then quenched. It is desirable that the quenching medium be liquid nitrogen.

Examples of the present invention and the comparative example are summarized in Table 1.

As shown in the table, No. 1 to No. 20 from the examples have a nitrogen-containing fcc phase (γ-Fe: γ phase). On the other hand, No. 21 and No. 22 from the comparative example do not have a nitrogen-containing fcc phase. In the comparative example, No. 21 has a low average nitrogen concentration of 0.1 mass %. No. 22 from the comparative example is pure iron.

In both the examples and the comparative example, the saturation magnetic flux density Bs is 2 T or more. In the examples, the bct martensite is stabilized and the heat resistance (thermal stability) reaches a desired level because the examples contain γ-Fe.

the magnet. Therefore, it is possible to reduce the loss even at a high torque density, and to improve the efficiency at a high torque density.

TABLE 1

|  | No. | Saturation magnetic flux density Bs (T) | Co-ercive force (A/m) | Phase structure (vol %) | | | | Carbon and nitrogen concentrations (mass %) | | Additive element (mass %) |
|---|---|---|---|---|---|---|---|---|---|---|
|  |  |  |  | bcc martensite | bct martensite | nitrogen-containing fcc phase | fcc (Fe$_4$N) | Average carbon concentration | Average nitrogen concentration |  |
| Ex-ample 1 | 1 | 2.25 | 800 | 80 | 10 | 10 | 0 | 0.55 | 0.45 | No |
|  | 2 | 2.3 | 800 | 70 | 20 | 5 | 5 | 0.57 | 0.4 | No |
|  | 3 | 2.2 | 950 | 85 | 12 | 1 | 2 | 0.52 | 0.45 | No |
|  | 4 | 2.3 | 850 | 65 | 25 | 5 | 5 | 0.45 | 0.55 | No |
|  | 5 | 2.35 | 840 | 60 | 25 | 10 | 5 | 0.51 | 0.62 | No |
|  | 6 | 2.4 | 1050 | 65 | 20 | 10 | 5 | 0.75 | 0.68 | No |
|  | 7 | 2.4 | 1100 | 60 | 15 | 15 | 5 | 0.82 | 0.67 | No |
|  | 8 | 2.4 | 1200 | 71 | 9 | 15 | 5 | 0.55 | 0.52 | No |
|  | 9 | 2.1 | 1500 | 79 | 15 | 1 | 5 | 0.86 | 0.53 | No |
| Ex-ample 2 | 10 | 2.45 | 1100 | 65 | 15 | 15 | 5 | 0.75 | 0.82 | V (0.05) |
|  | 11 | 2.45 | 950 | 70 | 10 | 17 | 3 | 0.77 | 0.85 | Nb (0.03) |
|  | 12 | 2.1 | 1250 | 70 | 25 | 2 | 3 | 0.95 | 0.24 | No |
|  | 13 | 2.5 | 920 | 80 | 10 | 5 | 5 | 0.92 | 0.85 | No |
|  | 14 | 2.5 | 900 | 70 | 15 | 12 | 3 | 0.97 | 1.05 | No |
| Ex-ample 3 | 15 | 2.55 | 980 | 60 | 25 | 10 | 5 | 0.85 | 1.15 | V (0.02) |
|  | 16 | 2.55 | 1500 | 55 | 35 | 10 | 5 | 0.95 | 0.92 | V (0.02) |
|  | 17 | 2.6 | 1200 | 30 | 60 | 6 | 4 | 1.12 | 0.95 | No |
|  | 18 | 2.7 | 1300 | 15 | 75 | 5 | 5 | 1.05 | 1.02 | No |
|  | 19 | 2.8 | 1500 | 10 | 80 | 5 | 3 | 1.05 | 1.2 | No |
|  | 20 | 2.4 | 1600 | 8 | 90 | 1 | 1 | 1.03 | 0.85 | No |
| Com-parative Example | 21 | 2 | 1900 | 9 | 90 | 0 | 1 | 1.03 | 0.1 | No |
|  | 22 | 2.15 | 1000 | 100 | 0 | 0 | 0 | 0 | 0 | No |

Figure 5:
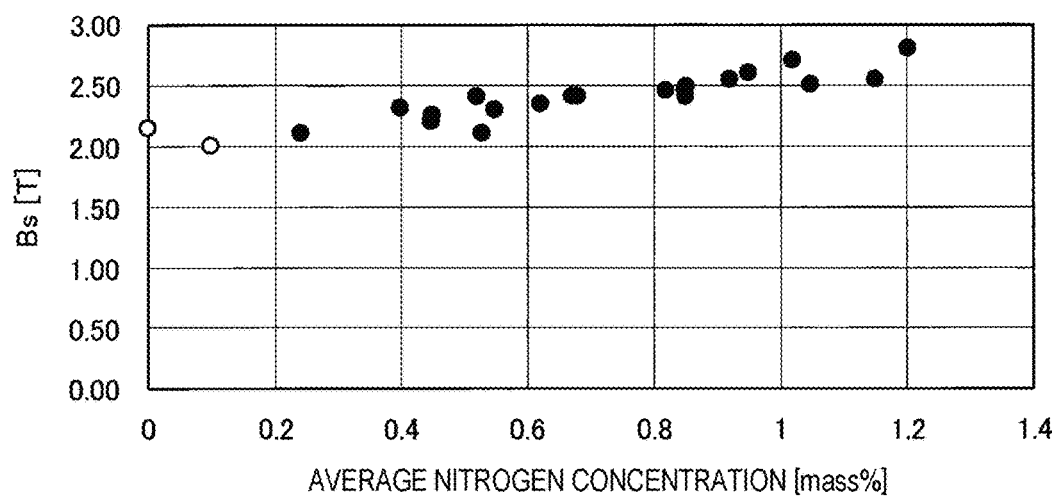
FIG. 5 is a graph showing nitrogen concentration dependence of saturation magnetic flux density Bs for soft magnetic materials of examples.

FIG. 5 shows nitrogen concentration dependence of saturation magnetic flux density Bs based on the data in Table 1. The horizontal axis represents the average nitrogen concentration, and the vertical axis represents Bs. Black circles represent the examples, and open circles represent the comparative example.

As shown in the graph, Bs increases substantially in proportion to the average nitrogen concentration.

Example 5

Figure 6:
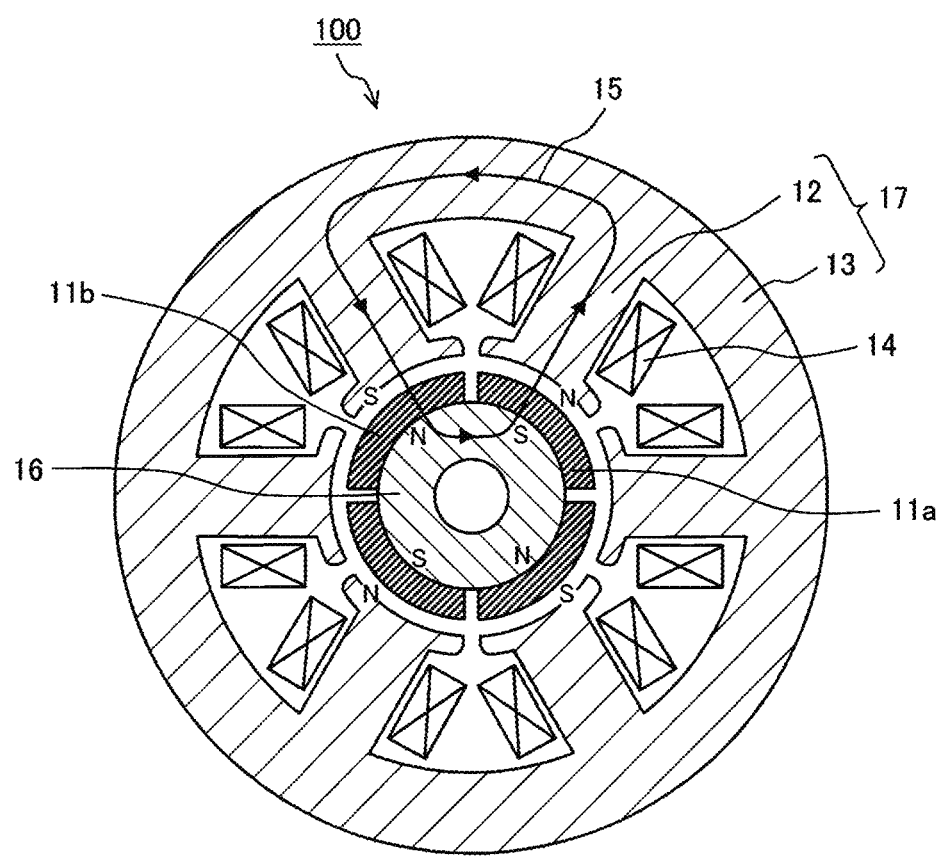
FIG. 6 is a schematic cross-sectional view showing an electric motor of an example.

FIG. 6 shows a cross section of the electric motor of the example.

In the drawing, an electric motor 100 includes a core 17 (iron core) including teeth 12 and a back yoke 13, coils 14, and a rotor 16. Low-loss rare earth magnets 11a and 11b are arranged on a surface of the rotor 16. The teeth 12 and the back yoke 13 are formed by laminating pieces of iron-1 mass % carbon-1 mass % nitrogen foil. The core 17 may be produced by preparing pieces of foil having a shape in which the teeth 12 and the back yoke 13 are bonded together, and laminating the pieces of foil. Alternatively, the core 17 may be produced by separately producing the teeth 12 and the back yoke 13 by laminating pieces of foil, and combining the resulting laminates.

The foil material has a saturation magnetic flux density of 2.7 T, and the laminate has a saturation magnetic flux density of 2.6 T. The low-loss rare earth magnets 11a and 11b generate magnetic flux 15 in a magnetic path of the core 17, and torque is generated by the relation between the magnetic flux 15 and the current flowing through the coils 14.

Since the foil material has a saturation magnetic flux density of 2.7 T, magnetic saturation is unlikely to occur, and the reduction of eddy current loss due to the lamination eliminates the need for weakening of the magnetic field of

REFERENCE SIGNS LIST 1 iron sheet
2, 5 rolling roll
3, 4 radio frequency coil
6, 7 heater furnace
11a, 11b low-loss rare earth magnet
12 teeth
13 back yoke
14 coil
16 rotor
17 core
21 white region
22 black region
23 gray region
100 electric motor

The invention claimed is:

1. A soft magnetic material that is sheet-shaped or foil-shaped, the soft magnetic material comprising:
   iron, carbon, and nitrogen having an average carbon concentration of 0.45 mass % or more and 1.12 mass % or less, and an average nitrogen concentration of 0.4 mass % or more and 1.2 mass % or less; and
   a martensite containing carbon and nitrogen, and γ-Fe,
   wherein the phase structure of the martensite is 80 vol. % or more,
   wherein the γ-Fe includes a face-centered cubic crystal containing nitrogen, and
   wherein the soft magnetic material has a saturation magnetic flux density of 2.3 T or more and a thickness of 0.01 mm or more and 1.00 mm or less.

2. The soft magnetic material according to claim 1, wherein a volume fraction of the face-centered cubic crystal is 1 vol % or more and lower than a volume fraction of the martensite.

3. The soft magnetic material according to claim 2, wherein the volume fraction of the face-centered cubic crystal is 1 vol % or more and 20 vol % or less.

4. The soft magnetic material according to claim 1, wherein the martensite includes a body-centered cubic crystal and a body-centered tetragonal crystal.

5. The soft magnetic material according to claim 1, further comprising vanadium or niobium.

6. The soft magnetic material according to claim 1 further comprising a Fe4N phase having a face-centered cubic crystal.

7. The soft magnetic material according to claim 1, wherein the martensite is from $Fe_3C$ dispersed in γ-Fe—N in which the $Fe_3C$ is decomposed into the γ-Fe.

8. An electric motor comprising:
   a core;
   a coil; and
   a rotor,
   wherein the core contains the soft magnetic material according to claim 1.

9. The electric motor according to claim 8, wherein the core is a laminate of the soft magnetic material.

10. A method for producing the soft magnetic material according to claim 1, the method comprising:
   heating an iron-based material that is sheet-shaped or foil-shaped;
   carburizing the iron-based material with a carburizing gas;
   dispersing a granular carbide in α-Fe in the iron-based material at a temperature equal to or lower than a eutectoid temperature;
   transforming the α-Fe into γ-Fe at a temperature higher than the eutectoid temperature;
   diffusing nitrogen into the γ-Fe using a nitrogen supply gas to form γ-Fe—N—C; and
   rapidly heating and then rapidly cooling the γ-Fe—N—C to transform the Y—Fe—N—C into a martensite.

11. The production method according to claim 10, wherein the iron-based material has a thickness of 0.01 mm or more and 1.00 mm or less.

12. The production method according to claim 10, wherein the iron-based material is pure iron or a low-carbon low-alloy steel.

13. The production method according to claim 10, wherein the carburizing gas is acetylene.

14. The production method according to claim 10, wherein the nitrogen supply gas is ammonia.

15. The production method according to claim 10, wherein the rapid cooling is performed using liquid nitrogen.

16. The production method according to claim 10, wherein the soft magnetic material including the martensite formed therein has an average carbon concentration of 0.45 mass % or more and 1.12 mass % or less, and an average nitrogen concentration of 0.4 mass % or more and 1.2 mass % or less.

17. The production method according to claim 10, wherein the iron-based material contains vanadium or niobium.

* * * * *